No. 611,348. Patented Sept. 27, 1898.
W. A. BOLE & T. J. HOGAN.
IGNITING DEVICE FOR GAS ENGINES.
(Application filed July 30, 1897.)

(No Model.) 6 Sheets—Sheet 1.

WITNESSES:
E. Gallagher
Chas. F. Miller

INVENTORS:
William A. Bole,
Thomas J. Hogan,
by T. J. Hogan, Att'y.

No. 611,348. Patented Sept. 27, 1898.
W. A. BOLE & T. J. HOGAN.
IGNITING DEVICE FOR GAS ENGINES.
(Application filed July 30, 1897.)
(No Model.) 6 Sheets—Sheet 2.
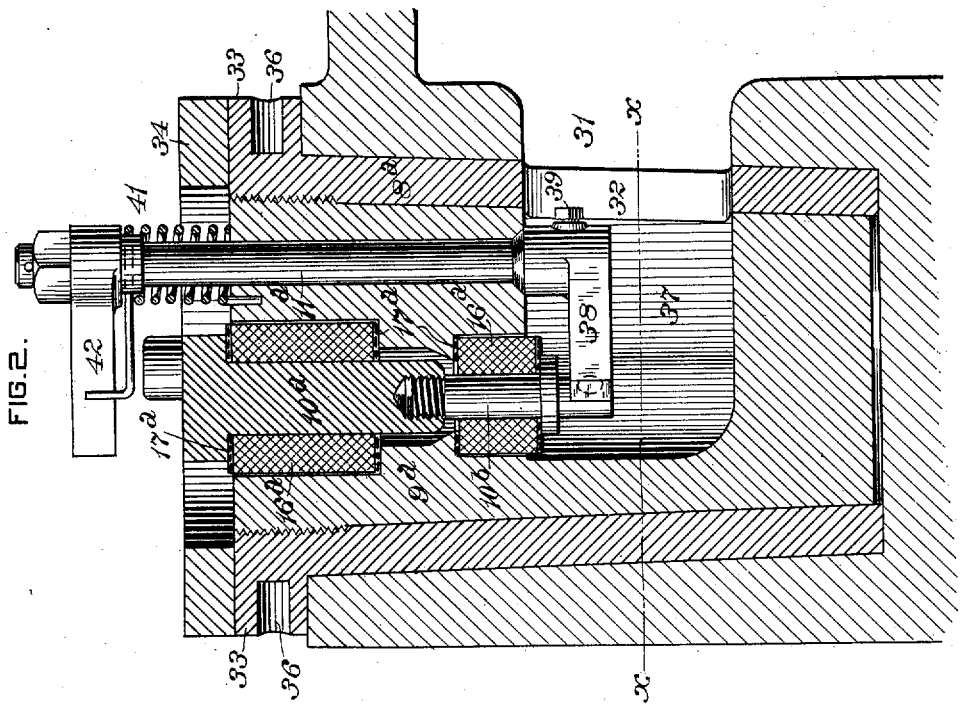
WITNESSES:
E. Gallagher
Chas. F. Miller
INVENTORS:
William A. Bole,
Thomas J. Hogan,
by T. J. Hogan, Att'y.

No. 611,348. Patented Sept. 27, 1898.
W. A. BOLE & T. J. HOGAN.
IGNITING DEVICE FOR GAS ENGINES.
(Application filed July 30, 1897.)
(No Model.) 6 Sheets—Sheet 3.
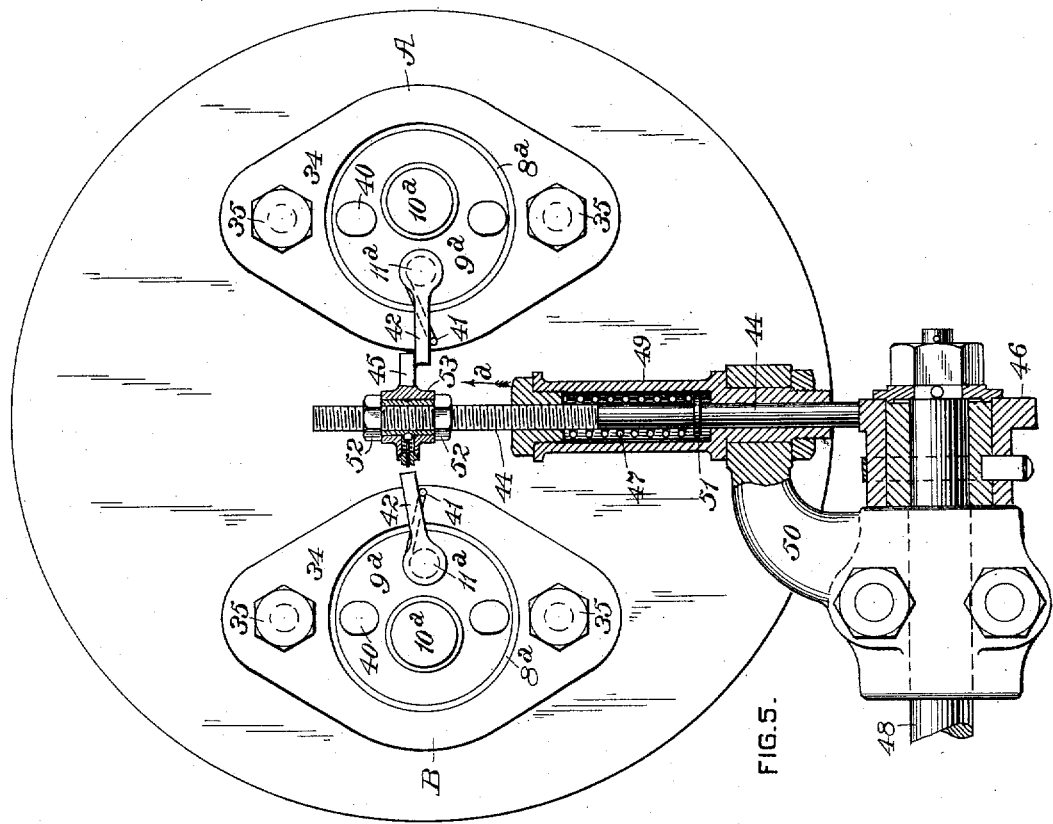
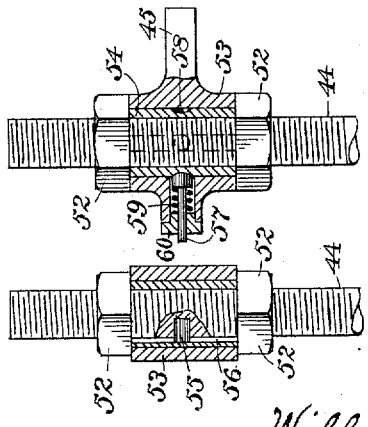
WITNESSES:
E. Gallagher
Chas. F. Miller
INVENTORS:
William A Bole,
Thomas J. Hogan,
by T. J. Hogan, Att'y.

No. 611,348. Patented Sept. 27, 1898.
W. A. BOLE & T. J. HOGAN.
IGNITING DEVICE FOR GAS ENGINES.
(Application filed July 30, 1897.)
(No Model.) 6 Sheets—Sheet 4.

WITNESSES:
E. Gallagher
Chas. F. Miller

INVENTORS:
William A. Bole.
Thomas J. Hogan,
by T. J. Hogan, Att'y.

THE NORRIS PETERS CO., PHOTO-LITHO., WASHINGTON, D. C.

No. 611,348. Patented Sept. 27, 1898.
W. A. BOLE & T. J. HOGAN.
IGNITING DEVICE FOR GAS ENGINES.
(Application filed July 30, 1897.)
(No Model.) 6 Sheets—Sheet 5.
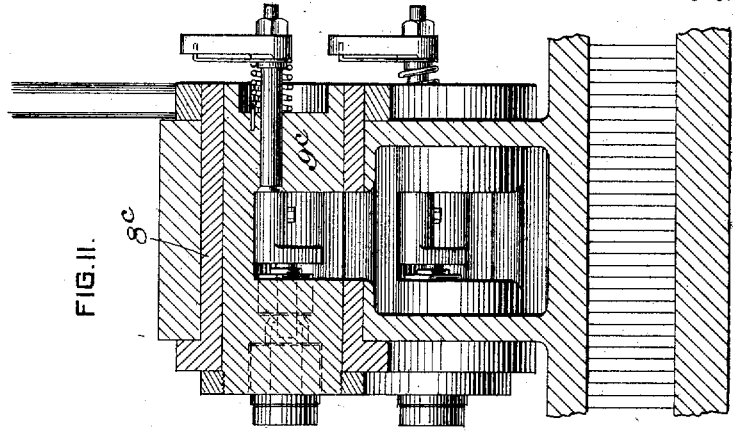
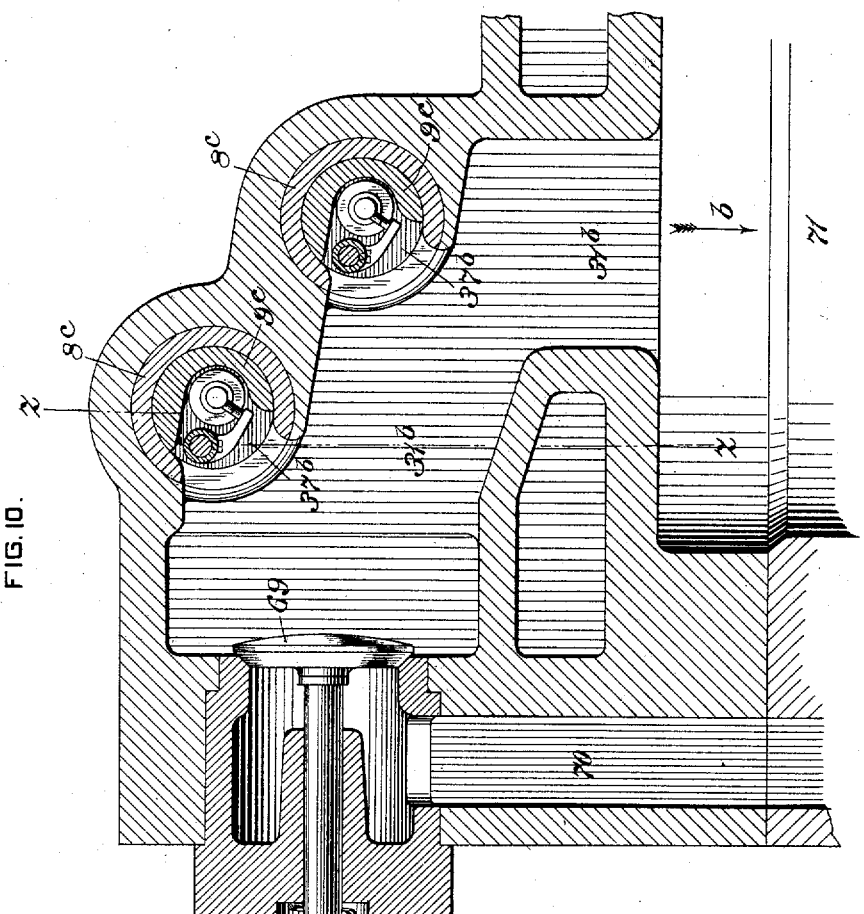
WITNESSES:
E. Gallagher
Chas. F. Miller
INVENTORS:
William A. Bole,
Thomas J. Hogan,
by T. J. Hogan, Att'y.
THE NORRIS PETERS CO., PHOTO-LITHO., WASHINGTON, D. C.

No. 611,348. Patented Sept. 27, 1898.
W. A. BOLE & T. J. HOGAN.
IGNITING DEVICE FOR GAS ENGINES.
(Application filed July 30, 1897.)

(No Model.) 6 Sheets—Sheet 6.

WITNESSES:
E. Gallagher
Chas. F. Miller.

INVENTORS:
William A. Bole,
Thomas J. Hogan,
by T. J. Hogan,
Att'y.

UNITED STATES PATENT OFFICE.

WILLIAM A. BOLE AND THOMAS J. HOGAN, OF PITTSBURG, PENNSYLVANIA.

IGNITING DEVICE FOR GAS-ENGINES.

SPECIFICATION forming part of Letters Patent No. 611,348, dated September 27, 1898.

Application filed July 30, 1897. Serial No. 646,463. (No model.)

*To all whom it may concern:*

Be it known that we, WILLIAM A. BOLE and THOMAS J. HOGAN, citizens of the United States, residing at Pittsburg, in the county of Allegheny and State of Pennsylvania, have invented or discovered a certain new and useful Improvement in Igniting Devices for Gas-Engines, of which improvement the following is a specification.

The object of our invention is to provide an improvement in gas-engines; and to this end our invention consists in an electrical igniting mechanism which, without interrupting or interfering with the operation of the engine, may be removed for repair or renewal or may be shifted in position so that it is accessible for cleaning or repair from the outside of the engine; and our invention further consists in certain combinations and features of construction, all as hereinafter set forth.

Figure 1:
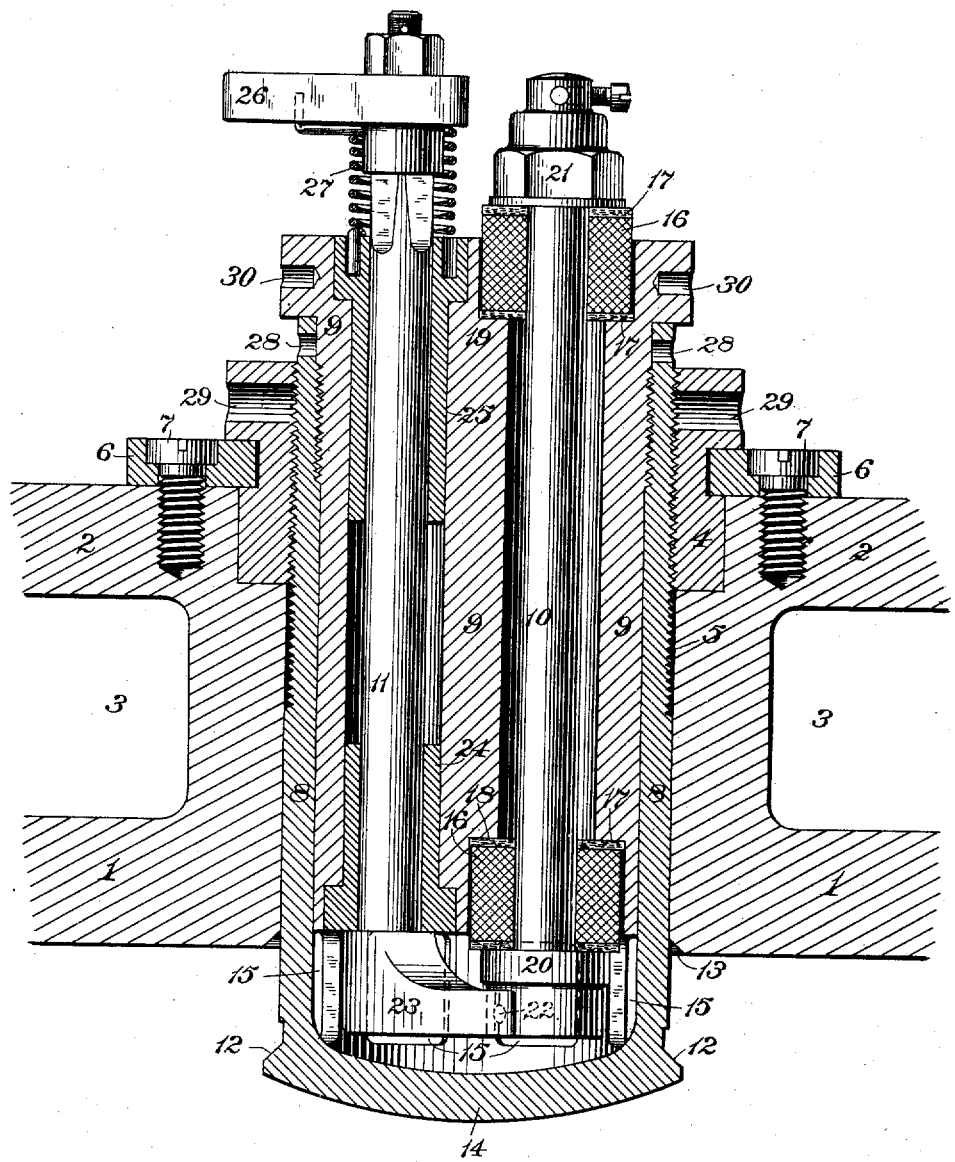
Figure 9:
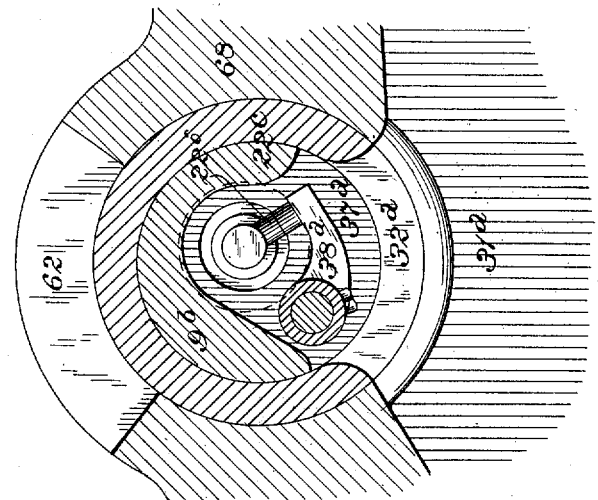
Figure 8:
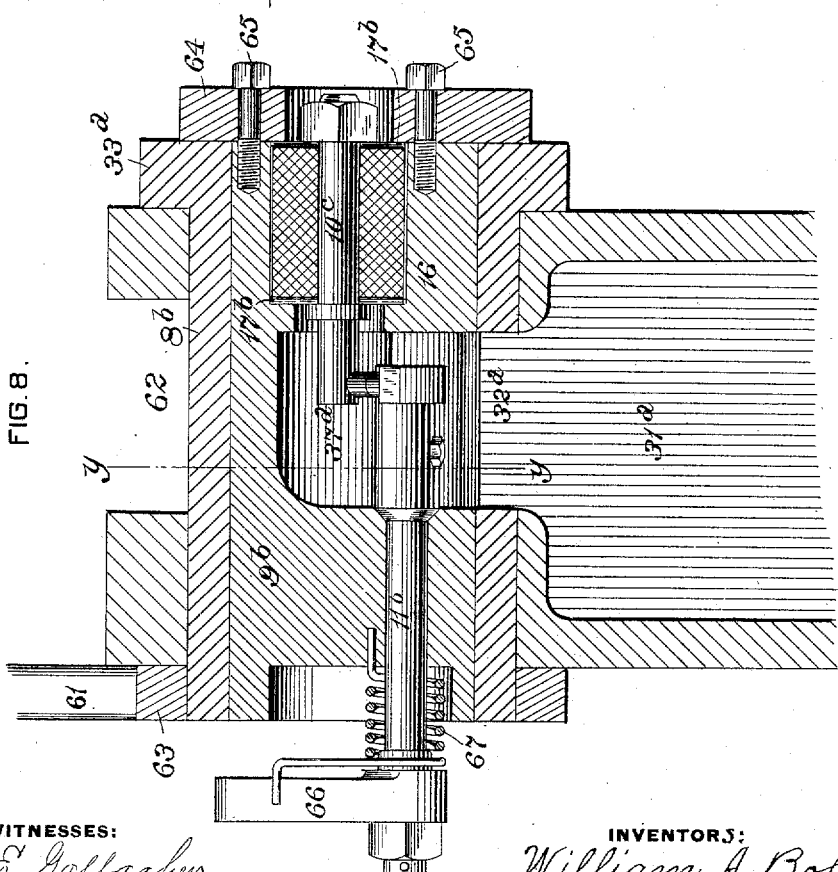

In the accompanying drawings, which illustrate applications of our improvement, Figure 1 is a central section through an electrical igniting mechanism constructed in accordance with our invention; Fig. 2, a similar section through a modification of our improvement; Fig. 3, a plan view of the device shown in Fig. 2; Fig. 4, a transverse section on the line $x\,x$ of Fig. 2; Fig. 5, a plan view showing two removable igniters and means for operating them; Figs. 6 and 7, detail views of a part of the operating mechanism shown in Fig. 5; Fig. 8, a central longitudinal section through a modification of the removable igniting device; Fig. 9, a transverse section on the line $y\,y$ of Fig. 8; Fig. 10, a section through a part of the cylinder-head of a gas-engine, through the igniting devices, and through the inlet-passage for the admission of air and gas; Fig. 11, a section on the line $z\,z$ of Fig. 10, and Fig. 12 a modification showing in plan view two removable igniters and means for operating them.

The vital feature of the internal-combustion engine may be said to be the means for igniting the combustible gases, and in every form of explosive-engine it is necessary that it should operate with regularity and precision if the engine is to be commercially successful. In practice, however, it has heretofore been found to be a most troublesome, expensive, and unreliable feature of the engine, particularly those devices involving the employment of a constantly-burning flame with valve devices for controlling the application to the charge, incandescent tubes kept constantly heated by a continuously-burning flame, and those devices in which hot or incandescent wires or other substances are kept hot by an electric current.

Our improvement relates to electric igniting means in which the combustible gases are ignited by a spark produced at the proper time by make-and-break mechanism; and it is a special feature of our improvement that the mechanism is capable of being inspected, cleaned, or repaired without affecting or interrupting the operation of the engine.

In the application of our improvement shown in the drawings we employ two separate igniting devices for each cylinder of an engine in combination with means for operating separately or independently each of the igniting devices, and provide means whereby each of the igniting devices may be disengaged from the operating means and either removed entirely from the engine, so that it may be repaired or another substituted for it, or shifted in position, so that it may be inspected, cleaned, or repaired. In some of the constructions shown removal from the engine is necessary to permit examination or repair, and in others, while the devices are for the same purposes removable, they are also adapted to be examined or repaired without removal and are adapted in any case to be disengaged from the operating mechanism.

In the construction shown in Fig. 1 the mechanism of a removable igniter is shown mounted in the double wall of a gas-engine cylinder, the inner wall 1 and the outer wall 2 inclosing between them the space 3, in which the cooling-water circulates. This double wall may form either the sides or the head of the cylinder and may or may not be removable from the main body of the cylinder, although in many cases it will be preferable that the igniting mechanism be mounted on the removable head of the cylinder.

As shown in Fig. 1, an annular ring 4 is fitted in a counterbore or enlargement of the opening 5, extending through the head or wall of the cylinder and is held in place by the parts 6 and the bolts 7. A casing 8, inserted through the opening 5 from the inside of the cylinder, engages with the part 4 by means of a screw-thread on its outer surface and contains within it a plug 9, in which the fixed and movable electrodes 10 and 11 are mounted. The tubular casing 8 is provided on its inner end with a conical projecting portion 12, forming the face of a valve which is adapted to fit the seat 13, formed on the inner wall 1 of the cylinder. The casing 8 is in the form of a tube throughout its length, except that portion of it which extends into the cylinder beyond the inner surface of the cylinder and which is provided with the openings 15, by which the combustible gases may be admitted to the sparking-points of the igniter. The continuous imperforate end portion 14 of the casing 8 forms the main body of the valve, which is adapted to fit on the seat 13, and when the casing 8 is moved to permit the seating of the valve 14 that valve closes the passage 5 formed through the wall of the cylinder.

The fixed electrode 10 is insulated from the plug 9 by the spools 16, of porcelain or other non-conducting material, and by the washers 17, also of non-conducting material, the insulating material being clamped between the shoulders 18 and 19 on the plug 9 and the head 20 and nut 21, respectively, on the electrode 10. A sparking-point projecting from the head 20 on the fixed electrode is adapted to be engaged by a similar sparking-point projecting from the arm 23 on the movable electrode, these sparking-points being short pins, (indicated by dotted lines in Fig. 1 and marked 22.) The movable electrode 10, mounted in the bushings 24 and 25, so as to be in electrical connection with the plug 9 and with the wall of the cylinder, is adapted to be oscillated so as to make and break contact between the sparking-points of the two electrodes, and for this purpose it is provided on its outer end with an arm 26, which is engaged by one end of a spring 27, the other end of the spring being removably fitted in a hole in the bushing 25. When the igniter is to be operated, the arm 26 may be arranged in the path of or in position to be engaged by the actuating mechanism, which gets its motion from the engine or some other source.

The plug 9 is closely fitted inside of the casing 8 and is provided with a screw-thread near its outer end which engages with a screw-thread on the inside of the casing 8.

In Fig. 1 the igniting device is shown with the parts in the positions which they will occupy when in condition for operation. In accordance with our invention each cylinder will be provided with two igniting devices, so that when one of them is removed the other may be brought into action, and it is not essential that the two devices should be of the same or of a similar kind.

When a cylinder is provided with two igniters, one of which is like that shown in Fig. 1, and it is desired to remove the latter, the casing 8 may be prevented from turning by inserting a bar or rod in one of the holes 28, formed in its outer end, and if the ring 4 be then rotated by means of a bar or rod inserted in one of the holes 29 the tubular casing 8 will be moved outward until the conical surface 12 of the valve 14 bears on the seat 13. The movement of the casing 8 will thus close the opening 5 through the wall of the cylinder, cutting off escape of the gases from the cylinder and preventing their access to the sparking-points. When the valve 14 is thus seated on the wall of the cylinder, the plug 9 and the fixed and movable electrodes may be removed from the casing 8 by rotating the plug 9 until the screw-thread on its outer surface is disengaged from the screw-thread on the inner surface of the casing 8. The rotation of the plug 9 may be effected by means of a bar or rod inserted in one of the holes 30, or the head of the plug may be of such a shape that it may be seized with a wrench and turned thereby. When the plug 9 is removed, the sparking-points and electrodes may be examined, cleaned, and repaired and the insulation of the fixed electrode renewed, and the plug may then be refitted in the casing 8 and the casing 8 may be returned to the position shown in Fig. 1 of the drawings. When the plug 9 has been removed, a similar new plug may be immediately substituted for it, if preferred, and the igniting device need not then be inoperative any longer than is necessary to make such change.

In Fig. 2 is shown a modification of the igniting device of our improvement in which the casing $8^a$ is mounted in an opening in the cylinder head or wall or an extension of the cylinder head or wall, the opening being adapted to communicate with the interior of the cylinder through a passage 31. The casing $8^a$ is provided with a lateral opening 32, shown registering with the passage 31, and the outer end of the casing $8^a$ is provided with a flange 33, bearing against the outer surface of the cylinder head or wall, against which it is held by the plate 34, secured by the bolts 35. (Shown in Fig. 3.) The plug $9^a$ is closely fitted in the casing $8^a$ and near its outer end is provided with a screw-thread which engages with a screw-thread on the casing $8^a$. The fixed electrode consists of the two portions $10^a$ and $10^b$, which are secured together by a screw-thread connection and are insulated from the plug $9^a$ by the spools or removable collars $16^a$ and the gaskets $17^a$, which may be similar to those shown in Fig. 1, although they are in Fig. 2 of different sizes. The inner ends of the fixed and movable electrodes, which carry the sparking-points $22^a$ and $22^b$, (shown in Fig. 4,) are located in a chamber or cavity 37, formed in the plug $9^a$, and this chamber or cavity is normally in communication with the interior of the cylinder through the passages 32 and 31, so that when a spark is generated by the separation of the sparking-points $22^a$ and $22^b$ the combustible gases in the engine-cylinder will be ignited. The fixed electrode is made in two separable parts, one of which, $10^b$, is comparatively short in order that the part $10^b$ may be put in place through the chamber or cavity 37, and the construction of the movable electrode is such that the arm 38 may be easily detachable from the stem $11^a$, to which is secured by the set-screw 39. The fixed and movable electrodes are therefore easily removable from the plug $9^a$.

When it is desired to disengage the igniting device (shown in Fig. 2) and to render it inoperative, the casing $8^a$ may be turned by means of a bar or pin inserted in one of the openings 36 until the opening 32 in the casing no longer registers with the passage 31. Admission of the gases to the cavity or chamber 37 and to the sparking-points will then be cut off and the plug $9^a$, with the fixed and movable electrodes, may be removed from the casing $8^a$ by rotating the plug until the screw-thread on the plug is disengaged from the screw-thread on the casing $8^a$. In order that the plug may be easily rotated, projections 40 are shown extending outward from the plug in position to be engaged by a bar or rod which may be placed diagonally between them so as to engage with their opposite sides. A spring 41, which engages with the arm 42 of the movable electrode $11^a$, has one end fixed in the plug $9^a$ and tends to make contact between the sparking-points $22^a$ and $22^b$.

With the construction shown in Figs. 2, 3, and 4, when the plug $9^a$ has been removed a similar plug with a fixed and a movable electrode may be immediately substituted for it, and if the casing $8^a$ be turned back so as to open communication between the chamber 37 and the passage 31 through the port 32 the device may be operated immediately.

In Fig. 5 of the drawings we have shown a plan view of a cylinder-head with two removable igniters fitted thereto and mechanism for operating either of the igniters at will. The removable igniting devices shown in Fig. 5 are the same as that shown in Figs. 2, 3, and 4, and the parts, so far as they are shown in Fig. 5, are similarly numbered. The actuating mechanism by which the igniters may be operated is not limited to the particular construction shown in Fig. 5, and it will be understood that any of the forms of removable igniters herein shown may be employed with this or some other actuating mechanism. The plan views of the removable igniting devices shown in Fig. 5 on each side of the actuating mechanism may therefore be regarded as the equivalent of any of the removable igniters herein shown and described.

In Fig. 5 the fixed electrodes, the ends only of which are shown, are marked $10^a$, and the movable electrodes $11^a$ are provided with arms 42, which extend toward a common actuating-tappet in position to be actuated thereby at the proper time. The springs 41, which bear on the arms 42, normally hold the sparking-points of the igniters in contact, and the actuating mechanism between the arms 42 breaks the contact and creates a spark.

The actuating mechanism, as shown, consists of a shaft 44, carrying a tappet 45 and adapted to be moved in one direction by a cam 46 and in the opposite direction by a spring 47. The cam 46 is mounted on and rotates with a shaft 48, which may be operatively connected with a moving part of the engine. The spring 47 is located in a tubular casing 49, secured to a bracket 50 and bears at one end against a plug in the end of the tubular casing and at the other end against a collar 51 on the reciprocating rod or shaft 44. A bushing 54 is fitted on the shaft 44 and prevented from turning thereon by means of a pin 55, which fits in a slot 56, formed on the inside of the bushing. A sleeve 53, from which the tappet or arm 45 projects, fits over the bushing and is prevented from turning thereon by the pin 57, the large head of which is adapted to be pressed by a spring 59 into one of the depressions 58 on opposite sides of the bushing. The end of the stem 57 projects out through the cap or plug 60, so that it can be pulled outward from the depression in which it rests to permit the turning of the sleeve 53 on the bushing 54. The bushing 54 is slightly longer than the sleeve 53 and is clamped between the nuts 52, the difference in length between the bushing and sleeve being sufficient to permit the sleeve to be easily turned when the pin 57 is disengaged from the hole or depression in the bushing.

As shown in Fig. 5, the tappet 45 is in position to engage with the arm 42 and to actuate the movable electrode of the igniting device A on the right of the shaft 44. When the shaft 44 is moved by the cam 46 in the direction of the arrow marked $a$, the pressure of the spring 41 on the arm 42 will cause the sparking-points of the igniter to make contact with one another and thereby close the electrical circuit, and when the shaft 44 is moved in the opposite direction by the action of the spring 47 the arm 42 on the movable electrode will be moved by the tappet 45, so as to separate the sparking-points of the movable and fixed electrodes and thereby break the circuit and cause a spark. If it is desired to operate the igniting device B on the left of the shaft 44, the sleeve 53 may be turned on the bushing 54, as already described, so as to bring the tappet-arm 45 into position to engage with the arm 42 on the movable electrode of the device B. The device A will then be inoperative by the movement of the shaft 44, and if it is desired to remove the plug $9^a$ of the device A this may be done by turning the casing $8^a$ so as to cut off communication between the cylinder and the space in which the igniting-points are located and then unscrewing the plug $9^a$, as already described with reference to the construction shown in Figs. 2, 3, and 4. In case the devices A and B of Fig. 5 are of the construction shown in Fig. 1 the removal will be effected as described in referring to that construction.

In Figs. 8 and 9 we have shown a construction in which a casing or bushing $8^b$ is fitted with a plug $9^b$, containing a fixed and a movable electrode mounted in its opposite ends. In this construction both ends of the casing or bushing $8^b$ and of the plug $9^b$ extend outside of the casting in which they are mounted and are exposed to the atmosphere. This construction is specially adapted to be employed when the igniter is to be located in position to be open to a passage-way the walls of which extend beyond the walls of the cylinder or cylinder-head—for example, as shown in Fig. 10.

In the construction shown in Fig. 8 a handle 61, secured to the bushing $8^b$ by a set-screw or otherwise, may be employed for turning the bushing. The opening $32^a$ in the bushing $8^b$ is adapted to register with the passage $31^a$, communicating with the cylinder, or with the port 62, which opens to the atmosphere, or the bushing $8^b$ may be turned so as to close the opening $32^a$ and disconnect it from both of the passages or openings $32^a$ and 62. The plug $9^b$ and the inside of the casing $8^b$ are made slightly tapering, and the movable electrode $11^b$ is mounted in the larger end of the plug and the fixed electrode in the smaller end. The flange $33^a$ on one end of the bushing $8^b$ and the annular portion 63 of the handle 61 on the other end of the bushing $8^b$ secure the bushing against endwise movement, and endwise movement of the plug $9^b$ is prevented by the ring 64, which also clamps the insulating-spool $16^b$ and the insulating-washers $17^b$ in place. The ring 64 bears against the end of the bushing $8^b$ and is secured to the plug $9^b$ by the bolts 65. In the construction shown in Fig. 8 there is but one insulating spool or sleeve for the fixed electrode, and when the plate 64 is removed from the plug $9^b$ the sleeve $16^b$ and the fixed electrode $10^c$ may be together drawn outward and removed from the plug $9^b$. The arm 66 on the movable electrode $11^b$ is engaged by one end of a spring 67, the other end of which is inserted in a hole in the plug $9^b$. In this construction and in the constructions shown in Figs. 1, 2, 3, and 5 a series of holes placed at short distances apart may be provided to receive the stationary end of the spring, so that the end of the spring may be moved from one hole to another for the purpose of adjusting the resistance of the spring. This is shown in Fig. 1, in which two holes are shown in the bushing 25. The spring may at any time be disengaged from the electrode by compressing the spring longitudinally, so as to remove one end from contact with the arm of the movable electrode or so as to remove the other end of the spring from the hole in which it is fitted.

When it is desired to put the igniter shown in Figs. 8 and 9 out of action, the bushing $8^b$ may be turned so as to cut off communication between the chamber $37^a$ and the passage $31^a$, and the plug $9^b$ may then be removed after the plate 64 has been removed from its smaller end. As in the other constructions shown, the fixed and movable electrodes or any other part of the device may then be cleaned or repaired and returned to its place in the bushing $8^b$, or, if it is preferred, another plug, which is similarly provided with a fixed and a movable electrode, may be inserted in the bushing immediately after the removal of the first plug. If the intention is only to remove the plug $9^b$ from the bushing $8^b$, the bushing may be turned about ninety degrees, which will be sufficient to cut off the passage $31^a$, and the port $32^a$ in the bushing $8^b$ will then be closed by that portion of the casting marked 68 in Fig. 9. If it is desired only to inspect or clean the igniter or sparking-points, the bushing $8^b$ may be turned through one hundred and eighty degrees, so that the port $32^a$ in the bushing will register with the port 62 in the casting. The sparking-points $22^c$ and $22^d$ will then be accessible through the port 62. In case it is desired to protect the disengaged igniter from the action of the hot gases in the cylinder this may be done by turning either the bushing $8^b$ or the plug $9^b$, so as to cut off communication between the passage $31^a$ and the chamber $37^a$ in the plug. The plug $9^b$ may be rotated within the bushing $8^b$ by means of a wrench, which is made to grip the plate 64, or, if preferred, a handle may be provided on the plate 64 or on the plug $9^b$.

With regard to the construction shown in Figs. 8 and 9 it is to be understood that at least two igniters should be provided for each cylinder in case the removal of an igniter is to be effected without interrupting the operation of the engine. The arm 66 of the movable electrode is adapted to be moved by such an actuating means as that shown in Fig. 5 or by any other suitable mechanism.

The device shown in Figs. 8 and 9 is specially adapted to be employed in connection with such a construction as that shown in Figs. 10 and 11, in which the removable igniters are placed transversely to the passage $31^b$, which forms an admission-passage to the cylinder. The igniters are there shown so located that there will be no danger of the burned gases remaining in the space surrounding the sparking-points. When the main piston of the engine makes its charging stroke in the direction of the arrow marked $b$ in Fig. 10, the valve 69 will be unseated and the fluid will flow in through the passages 70 and $31^b$ to the cylinder. When the flow is once started, the momentum of the fluid will be such that the fluid will rush into the spaces surrounding the sparking-points and completely displace any burned gases which might otherwise tend to remain in the cavities $37^b$ of the plugs $9^c$.

Another advantage of the construction shown in Figs. 10 and 11 is that the igniting devices will be to a certain extent cooled by the contact of the incoming air and gases, and the direct impingement of the air and gases on the sparking-points while the air and gases are moving at a considerable velocity will tend to keep the points comparatively clean, or at least free of such accumulations as might under other circumstances be due to the settling of particles of matter or dirt under the action of gravity.

The construction of the igniters shown in Figs. 10 and 11 differs but little from that shown in Figs. 8 and 9. The port or opening 62 is not shown in Figs. 10 and 11, but it is obvious that such an opening might be provided. The plug 9° in Figs. 10 and 11, instead of being secured in the bushing 8° in the same manner as the plug in Fig. 8 is secured in the bushing 8ᵇ, is secured by means of a screw-threaded annular nut which is screwed on the small end of the slightly-tapering plug 9°.

Figure 12:
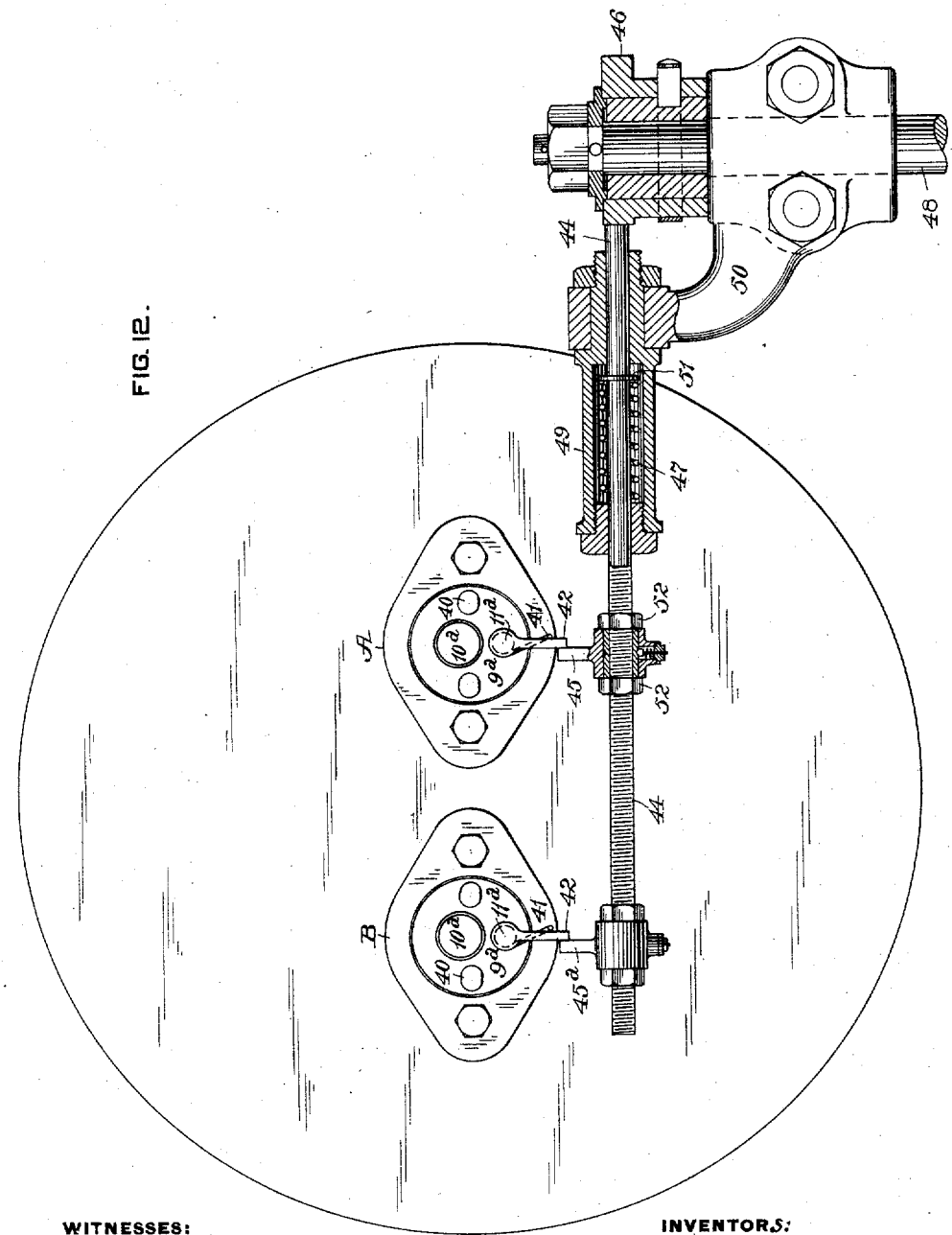

In Fig. 12 of the drawings we have shown two removable igniting devices A and B, in which the arms 42 of the movable electrodes are adapted to be engaged by separate tappets 45 and 45ª, mounted on the reciprocating rod 44 in what may be called a "tandem arrangement." The operating mechanism, comprising the shaft 48, cam 46, rod 44, spring 47, bracket 50, and tubular casing 49, are substantially the same as in Fig. 5, and the tappets 45 and 45ª are similarly mounted on the rod 44. This construction may for some reasons be preferable to that shown in Fig. 5 of the drawings. The provision of the two actuating-tappets 45 and 45ª permits the operation of both of the igniting devices at the same time, if desired, and when one of the tappets is disengaged from its movable electrode or while it is being disengaged therefrom the other tappet may be engaged with and continue to operate its movable electrode, thereby preventing any possibility of failure to ignite the gases at the proper time.

The actuating-tappets in both Figs. 5 and 12 require but an instant to be shifted from one position to another either to engage with or be disengaged from the arm of the movable electrode.

We claim as our invention and desire to secure by Letters Patent of the United States—

1. In a gas-engine, the combination, with a cylinder of the engine, of two electric igniters, each provided with a make-and-break device adapted to be operated to ignite the combustible gases, and means for cutting off communication between the cylinder and the spaces surrounding the make-and-break devices whereby one of the igniters may be removed while the other is being operated, substantially as set forth.

2. In a gas-engine, the combination, with a gas-engine cylinder, of a movable casing or bushing, mounted in the wall, or head of the cylinder, a fixed electrode and a movable electrode, an electric igniting device located within the casing, or bushing, means for moving the casing, or bushing, to cut off communication between the electrodes and the gases, and means whereby the electrodes may be removed, substantially as set forth.

3. An electric igniting device for gas-engines, comprising a valvular outer casing within which is located a fixed and a movable electrode for making and breaking an electric circuit and thereby effecting ignition of the combustible gases, substantially as set forth.

4. In an electric igniting device, a casing or bushing, a removable plug in the casing or bushing, a fixed and a movable electrode mounted in the plug, a port or opening in the casing, or bushing, through which admission of the combustible gases may be permitted to the electrodes, and means whereby the port or opening may be closed to prevent access of the gases to the electrodes, substantially as set forth.

5. In a gas-engine, the combination, with a gas-engine cylinder, of two electric igniting devices, each comprising a fixed and a movable electrode, means for actuating the movable electrodes, means whereby either of the movable electrodes may be disengaged from the actuating mechanism, and means whereby the corresponding igniting device may be removed from the engine, substantially as set forth.

6. In a gas-engine, the combination, with a gas-engine cylinder, of two electric igniters each adapted to be operated by a common actuating device, means for cutting off either igniter from the gases in the cylinder, and means whereby the actuating mechanism may be operatively engaged with the other igniter, substantially as set forth.

7. In a gas-engine, the combination, with the engine-cylinder, of two electric igniters each comprising a fixed and a movable electrode, a reciprocating rod, or shaft, having a tappet for engaging with one of the movable electrodes, and means whereby the tappet may be shifted to engage with the other movable electrode, substantially as set forth.

8. In a gas-engine, the combination, with the engine-cylinder, of two electric igniters, each provided with a movable electrode, means for actuating the movable electrodes, and a reversible tappet adapted to engage with either of the movable electrodes, substantially as set forth.

9. In a gas-engine, the combination, with the engine-cylinder, of two electric igniters, each provided with a movable electrode, a reciprocating rod actuated from a moving part of the engine for actuating the movable electrodes, a sleeve mounted on the rod and carrying a tappet which is adapted to engage with either of the movable electrodes, and means for shifting the sleeve and tappet to engage with the other movable electrode, substantially as set forth.

10. In an electric igniter for gas-engines, a removable plug, a fixed electrode and a movable electrode mounted in the opposite ends of the plug, a casing surrounding the plug, an opening in the casing through which the gases may have access to the electrodes, and means whereby the electrodes may be moved into position for inspection or repair without removing the igniter from the engine, substantially as set forth.

11. In a gas-engine, an electric igniting device comprising a fixed and a movable electrode located in a passage through which fluid is admitted to the cylinder of the engine, and means for cutting off communication between the passage and the electrodes, substantially as set forth.

12. In a gas-engine, a fixed and a movable electrode, located in a chamber, or cavity, communicating with the inlet-passage of a gas-engine cylinder, and in position to be swept by the incoming gases, and means for preventing access of the gases to the chamber, or cavity, substantially as set forth.

13. In a gas-engine, a fixed and a movable electrode, located in a chamber, or cavity, communicating with the clearance-space of the cylinder, and in position to be swept by the incoming gases, means for cutting off the chamber from the cylinder-space, and means whereby the electrodes may be removed without affecting the operativeness of the engine, substantially as set forth.

In testimony whereof we have hereunto set our hands.

WILLIAM A. BOLE.
THOMAS J. HOGAN.

Witnesses:
M. L. NEWELL,
E. GALLAGHER.